United States Patent
Boyne et al.

(10) Patent No.: US 6,385,353 B1
(45) Date of Patent: May 7, 2002

(54) ELECTRICALLY TUNEABLE OPTICAL FILTER

(75) Inventors: Colin M Boyne; John M Heaton; David R Wight, all of Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/529,541
(22) PCT Filed: Oct. 21, 1998
(86) PCT No.: PCT/GB98/03143
§ 371 Date: Apr. 14, 2000
§ 102(e) Date: Apr. 14, 2000
(87) PCT Pub. No.: WO99/22265
PCT Pub. Date: May 6, 1999

(30) Foreign Application Priority Data

Oct. 28, 1997 (GB) .............................. 9722685

(51) Int. Cl.[7] .............................................. G02F 1/035
(52) U.S. Cl. .............................. 385/2; 359/332; 385/3; 385/14; 385/15
(58) Field of Search .............................. 385/1–3, 8, 14, 385/15, 24, 27, 37, 39, 46; 359/325, 326, 332

(56) References Cited

U.S. PATENT DOCUMENTS

| 5,002,350 A | | 3/1991 | Dragone ..................... 359/124 |
| 5,239,598 A | * | 8/1993 | Wight et al. ..................... 385/8 |
| 5,410,625 A | * | 4/1995 | Jenkins et al. ................. 385/28 |
| 5,559,906 A | | 9/1996 | Maerz ........................... 385/3 |

FOREIGN PATENT DOCUMENTS

JP 3-171115 7/1991

OTHER PUBLICATIONS

Zirngibl M et al.: "An 18–Channel Multifrequency Laser" IEEE Photonics Technology Letters, Jul. 1996, IEEE, USA, vol. 8, No. 7, pp. 870–872.

Inoue Y: "Silica–Based Planner Lightwave Circuits for WDM Systems" Conference Edition. Summaries of the papers presented at the topical meeting, Integrated Photonics Research. 1996 Technical Digest Series. vol. 6, Proceedings of Integrated Photonics, Boston, MA, USA, Apr. 29–May 2, 1996, pp. 32–35, 1996, Washington, DC, USA, Opt. Soc. America, USA.

(List continued on next page.)

*Primary Examiner*—John D. Lee
(74) *Attorney, Agent, or Firm*—Nixon & Vanderhye P.C.

(57) ABSTRACT

A device for spatially separating components of frequency in a primary radiation beam comprising means for separating the primary radiation beam into a plurality of secondary radiation beams, a plurality of electrically biasable waveguides forming a waveguide array, each for transmitting a secondary radiation beam to an output, wherein each waveguide has an associated optical delay line having a corresponding optical delay time, wherein each of the optical delay times is different. The device also comprises means for applying a variable electric field across each of the waveguides such that the phase of the secondary radiation beams transmitted through each may be varied by varying the electric field. The secondary radiation beams output from each of the waveguides interfere in a propagation region with a secondary radiation beam output from at least one of the other waveguides so as to form an interference pattern comprising one or more maximum at various positions in the propagation region.

20 Claims, 7 Drawing Sheets

OTHER PUBLICATIONS

Figure 1:
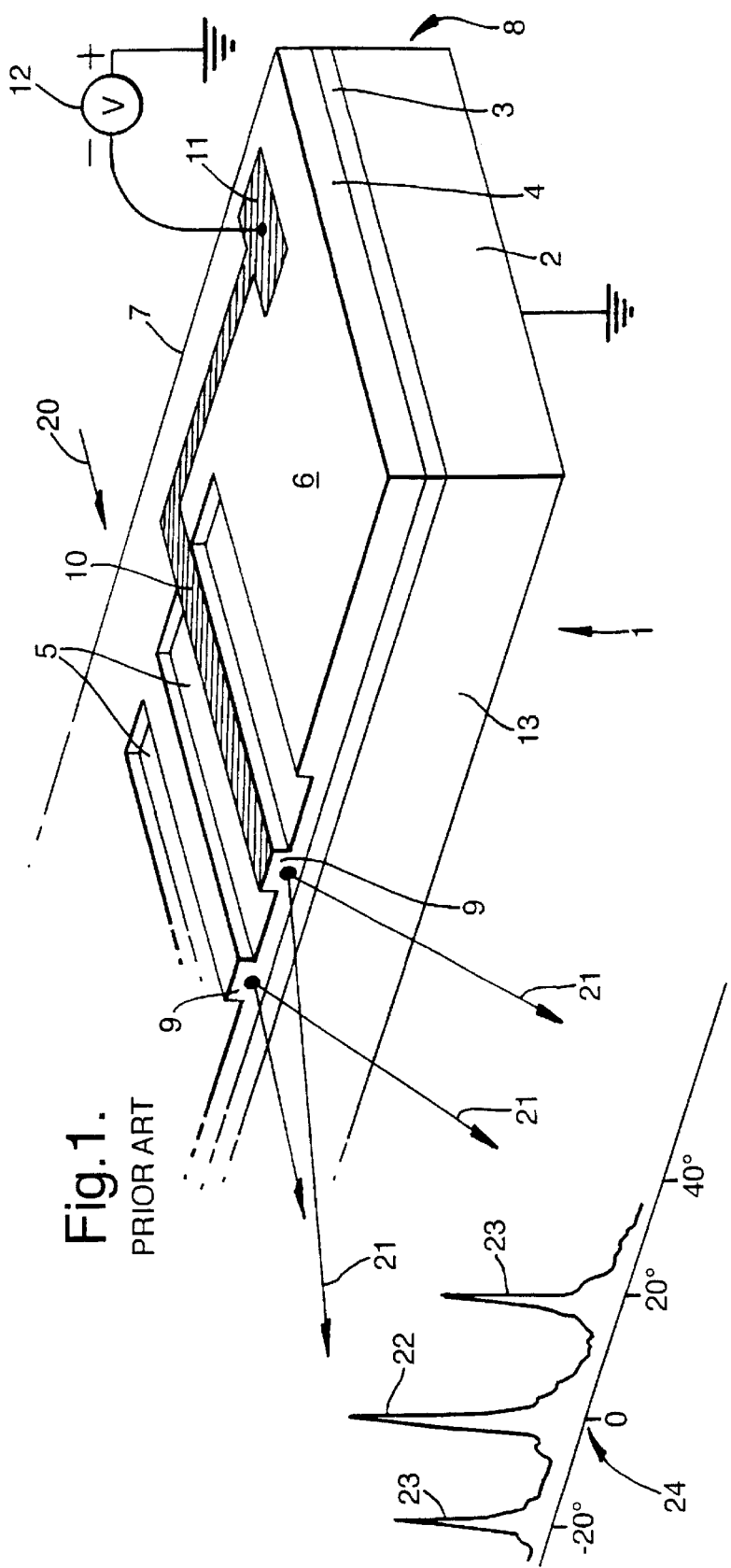

Spiekman L H et al.: "A Compact Phased Array Based Multi-Wavelength Laser" Conference Edition. Summaries of the papers presented at the topical meeting, Integrated Photonics Research. 1996 Technical Digest Series. vol. 6, Proceedings of Integrated Photonics, Boston, MA, USA, Apr. 29-May 2, 1996, Paper IMG3-1, pp. 136-138, 1996, Washington DC, USA, Opt. Soc. America, USA.

Heaton JM et al.: "Sixteen-Channel (1 to 16 GHz) Microwave Spectrum Analyzer Device based on a Phased-Array of GaAs/AlGaAs Electro-Optic Waveguide Delay Lines" SPIE vol. 3278—Integrated Optic Devices II, San Jose, CA, USA, Jan. 1998, vol. 3278, pp. 245-251, Proceedings of the SPIE—The International Society for Optical Engineering, 1998, SPIE—Int. Soc. Opt. Eng, USA.

* cited by examiner

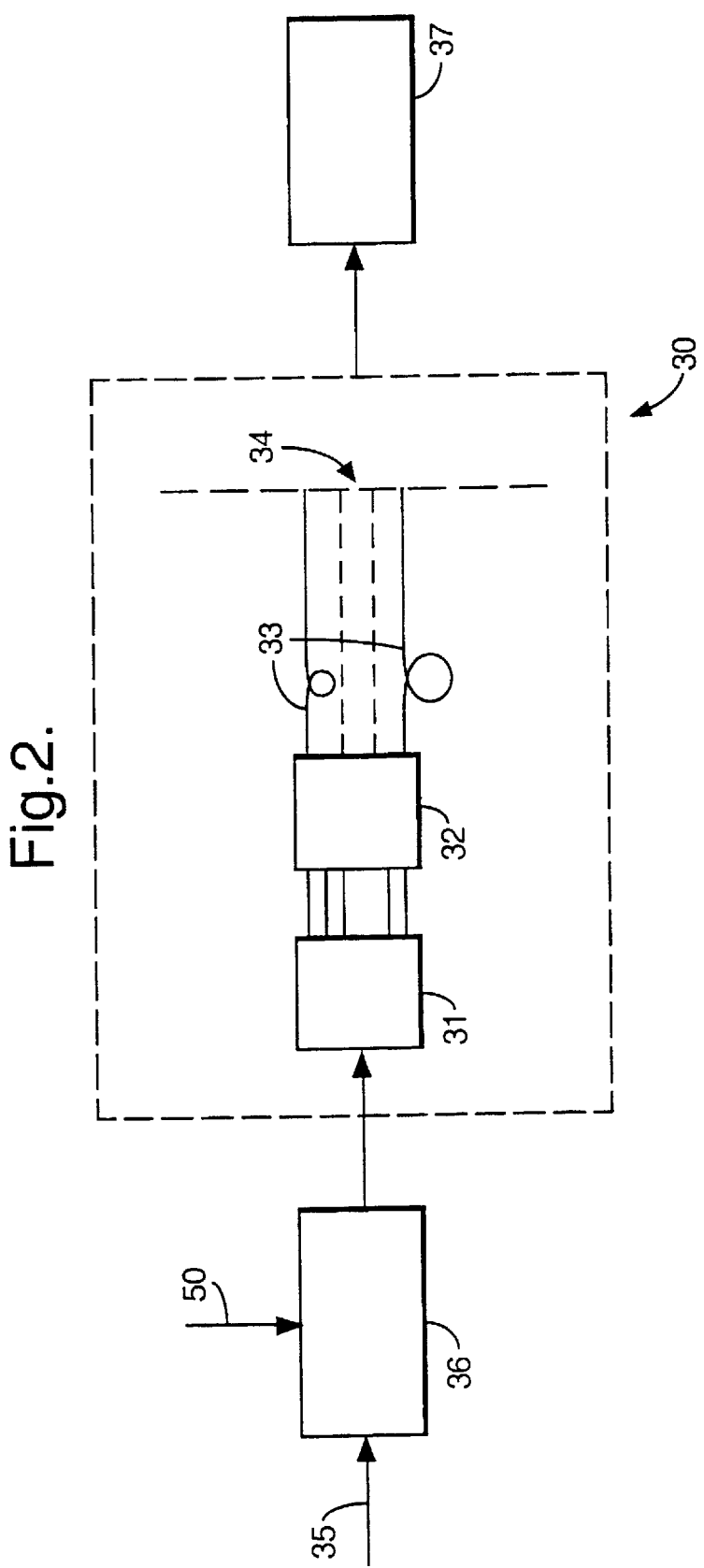

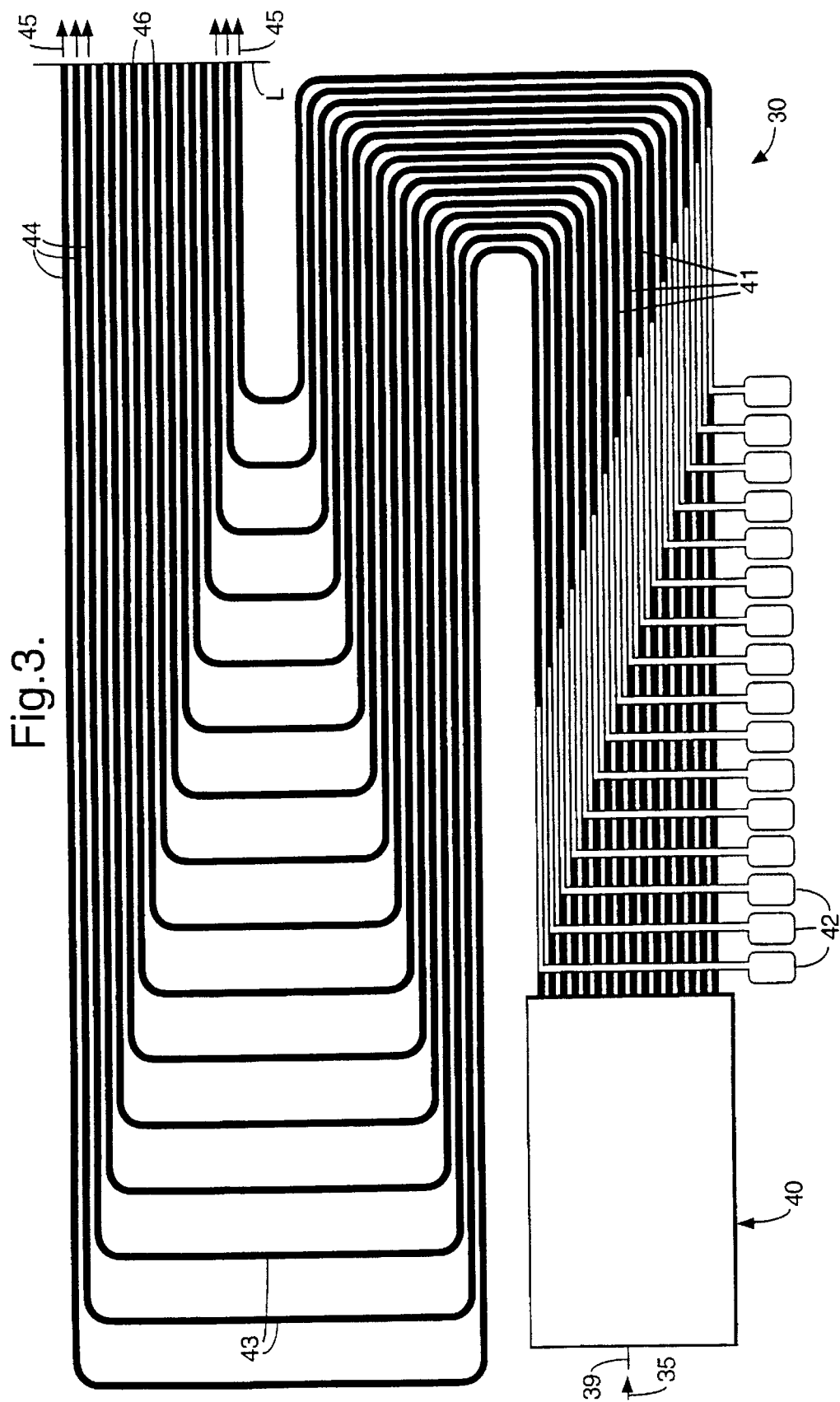

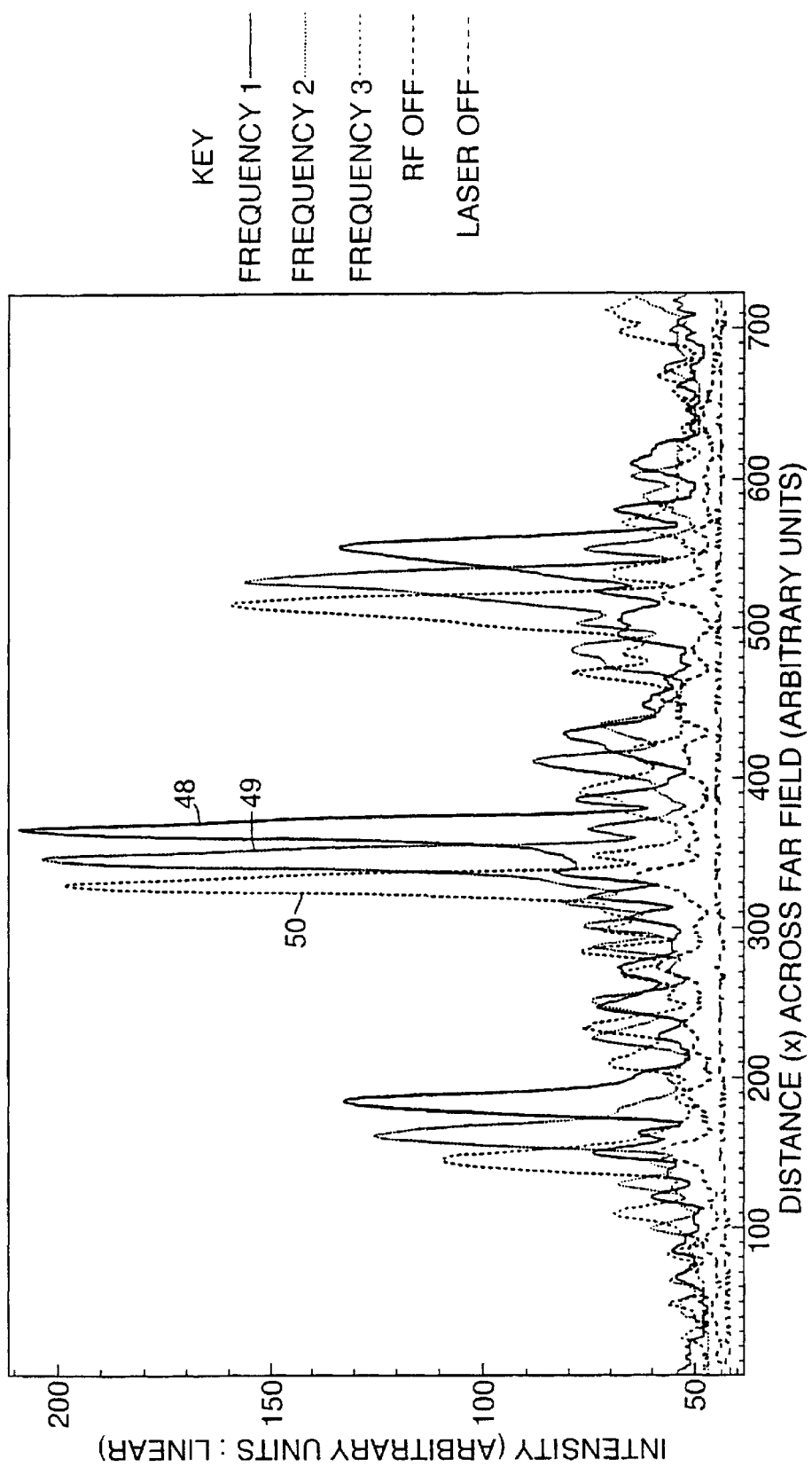

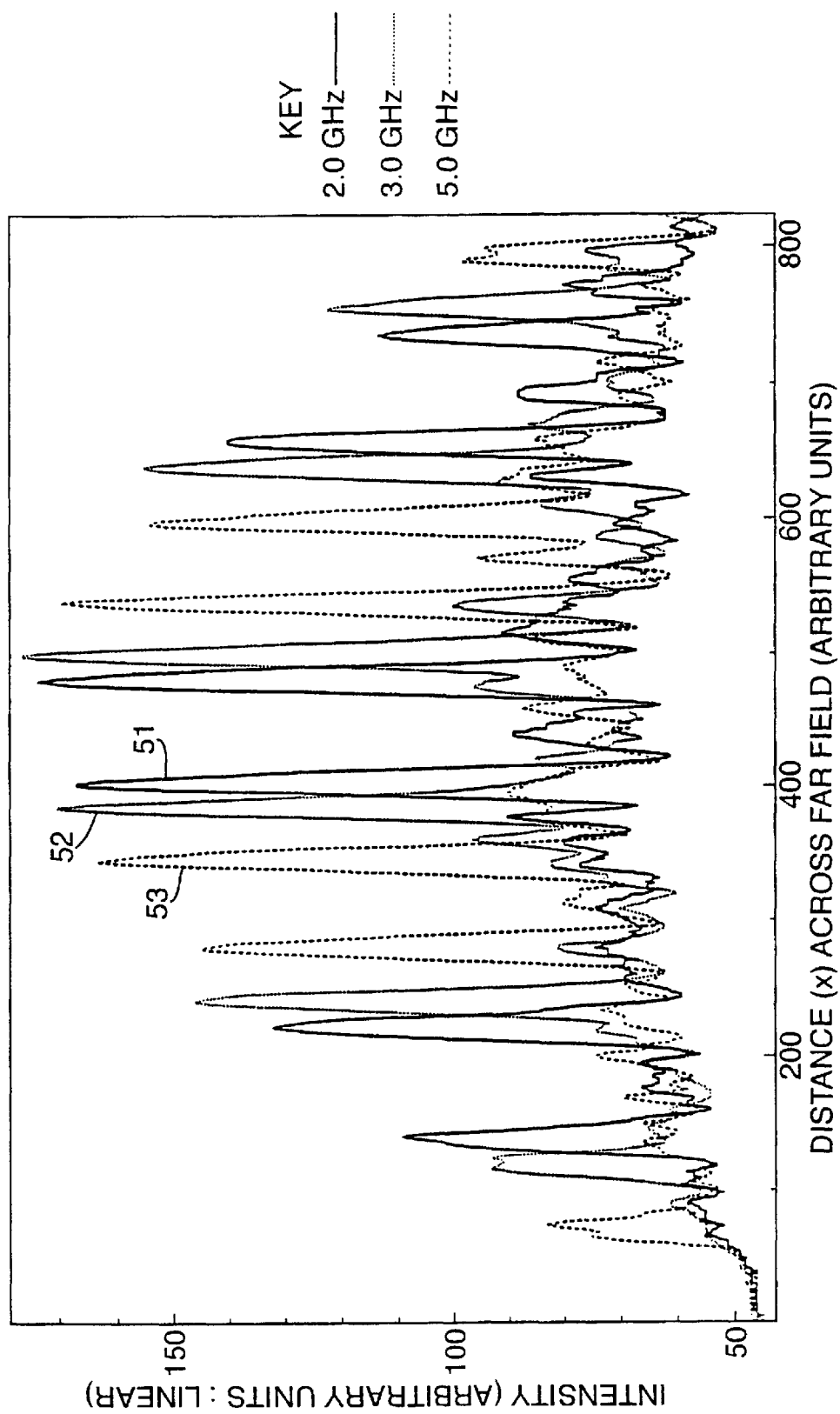

ELECTRICALLY TUNEABLE OPTICAL FILTER

The invention relates to an electrically tuneable optical filter which may be used, in particular, for spatially separating frequency components in an input beam of radiation, at microwave or optical frequencies. More particularly, the device may be used as a staring spectrum analyser or as a wavelength division multiplexer and demultiplexer.

There are two approaches to making a spectrum analyser. In one case, the input signal to be analysed may be passed through a tuneable filter with is scanned through the required frequency range. The transmission against the frequency of transmission of the filter is then measured to give the spectrum. Such systems are known as scanning spectrum analysers. Alternatively, the input signal may be split into a number of identical, lower power signals, each of which is then passed through a different filter from a set of equally spaced filters. The output powers of the filter set give the spectrum required. Such systems are known as staring spectrum analysers.

Conventional RF spectrum analysers, as used in the laboratory, are scanning spectrum analysers. This is because a scanning spectrum analyser can cover a wide range of frequencies with a high resolution and can easily be reconfigured as required. However, a scanning spectrum analyser is only useful for measuring input signals which are not changing rapidly, as they can only "look" at one frequency at a time. If, for example, the input signals contain fast pulses, the scanned spectrum analyser could easily miss pulses of some frequencies if it is not looking at the right frequency when the pulse arrives.

A staring spectrum analyser overcomes this problem. However, it is more difficult to make than a scanned spectrum analyser, especially if the number of frequency channels is high. As splitters tend to be narrow band components, it is difficult to split a broadband electrical RF signal many ways without severe distortion. Also, RF filters have to delay the signal by a time proportional to the inverse of the filter bandwidth, and this makes such components very large and difficult to make with low enough loss to achieve a resolution below around 100 MHz using conventional techniques.

Optical methods can be used to make both scanned and staring spectrum analysers. An example of a scanned optical spectrum analyser is a scanning Fabry Perot interferometer, which comprises two parallel (or confocal) plates which are moved towards and away from each other (usually using a sawtooth drive voltage). The output intensity plotted against time gives the optical spectrum ["Introduction to optical electronics", A. Yariv (Holt Reinhart and Winston, 1976)].

A grating spectrometer is an example of an optical staring spectrum analyser. This works by splitting the input beam into many hundreds of beams, changing the phase of each beam by an amount which depends linearly on its position (using the grating) and recombining all of the phase shifted beams on an output detector array. Because of the phase shifts, different optical frequencies recombine in phase at different places in the detector array.

Another type of staring optical spectrum analyser is an acoustic-optic device in which the signal to be analysed is used to drive an acoustic-optic transducer which launches an acoustic wave into a transparent piezoelectric and electro-optic material (e.g. lithium niobate). The acoustic waves can set up refractive index waves in such materials which diffract a light beam passing through them by an amount directly proportional to the RF frequency. In practice, this type of spectrum analyser can give very high resolution, mainly because acoustic waves travel much more slowly than electromagnetic waves, allowing longer delays to be achieved in short devices. However, they tend to be limited to frequencies below a few GHz because of acoustic losses.

Various optical waveguide versions of low resolution optical spectrometers have been demonstrated, usually for combining (multiplexing) or splitting (demultiplexing) a number of different wavelengths on one fibre. These are passive devices, however, rather than active devices, which are made by accurate lithography and design to control the optical phase shifts. However, lithographic inaccuracies are inevitable and this limits the resolution which may be achieved with such systems.

UK 2 269 678 A is in the field of the present invention. It describes an interferometric tuneable filter formed on a semiconductor substrate on which a waveguide is split into a plurality of branches of equal length. Each branch has electrically controllable amplitude and phase control elements for modulating the amplitude and phase of light transmitted through the branches. The filter has the function of selecting a predetermined wavelength light signal from a plurality of multiplexed light signals. The light transmitted through each branch is recombined to provide a single device output. The device described in UK 2 269 678 A therefore has the disadvantage that only one wavelength is output from the device, the others being lost in the substrate. The device is therefore not suitable for use as a spectrum analyser or in applications where multiple outputs of different wavelength are required.

According to the present invention, a device for spatially separating components of frequency in a primary radiation beam comprises;

means for separating the primary radiation beam into a plurality of secondary radiation beams each having a phase, $\phi$, a plurality of electrically biasable waveguides forming a waveguide array, each for transmitting a secondary radiation beam to an output, wherein each waveguide has an associated optical delay line having a corresponding optical delay time, wherein each of the optical delay times is different, means for applying a variable electric field across each of the waveguides such that the phase, $\phi$, of the secondary radiation beams transmitted through each of the waveguides may be varied by varying the electric field, whereby the secondary radiation beams output from each of the waveguides interfere in a propagation region with a secondary radiation beam output from at least one of the other waveguides to form an interference pattern comprising one or more maximum at various positions in the propagation region.

Preferably, the device provides at least two outputs.

The device may also comprise means for applying RF modulation to the primary radiation beam. The device may therefore be used as an optical staring spectrum analyser or an RF spectrum analyser and has an advantage over scanning spectrum analysers where signals of some frequencies may be missed if the device is not scanning at the right frequency when a pulse of radiation arrives. Furthermore, the device can be used to scan both optical and microwave frequencies by use of the RF modulation means and may be actively controlled in use by varying the electric fields applied across one or more of the electrically biasable waveguides. Because the phase of radiation transmitted through each of the waveguides may be varied, any inaccuracies in the design may therefore be corrected for in use, by varying the applied electric fields. This provides an advantage over passive devices used for multiplexing and demultiplexing beams.

In a preferred embodiment, each adjacent pair of waveguide outputs are spaced apart by an amount proportional to the optical time delay difference between the corresponding adjacent pair of waveguides. This has the advantage that different intensity maxima corresponding to different optical frequencies occur at well defined angles in the propagation region and the angular difference between the maxima for two different frequency components is substantially proportional to the difference in frequency between the two frequency components.

In a further preferred embodiment, the waveguides may have a substantially linear variation in optical time delay across the waveguide array.

Typically, the optical time delay difference across the waveguide array is at least 100 picoseconds and may be at least 10 nanoseconds.

The propagation region may be a region of free space or may be a slab waveguide. A slab waveguide may be used to advantage as it confines the secondary radiation beams, for example to a chip.

The electrically biasable waveguides may be group III–V semiconductor waveguides. For example, GaAs or InP/InGaAsP waveguides may be used.

The electrically biasable waveguides may be formed in one with the optical delay lines and the device may be formed on a single chip. Alternatively, each of the electrically biasable waveguides may comprise a electrically biasable waveguide and an optical fibre delay length.

The means for separating the primary radiation beam into a plurality of secondary radiation beams is a multi mode interference splitter.

Each of the electrically biasable waveguides may have independent means for varying the electric field across the electrically biasable waveguide portion. For example, each electrically biasable waveguide may have an independent variable voltage supply.

The device may also comprise one or more output waveguide located within the propagation region, such that the or each output waveguide may receive a secondary radiation beam of selected frequency output from one or more waveguide.

In addition, or alternatively, the device may also comprise an input laser having a laser cavity, wherein the electrically biasable waveguides form part of the laser cavity to enable selective wavelength tuning of the laser by variation of the electric fields applied across each of the waveguides.

According to a second aspect of the invention, a method for spatially separating components of frequency in a primary radiation beam comprises the steps of;

(i) separating the primary radiation beam into a plurality of secondary radiation beams each having a phase, $\phi$, (ii) transmitting each of the secondary radiation beams through one of a plurality of electrically biasable waveguide forming a waveguide array, wherein each waveguide has an associated optical delay line having a corresponding optical delay time, wherein each of the optical delay times is different, (iii) applying a variable electric field across each of the electrically biasable waveguides and (iv) varying the electric field across each of the electrically biasable waveguides so that the phase, $\phi$, of the secondary radiation beams transmitted through each of the electrically biasable waveguides may be varied, (v) outputting the secondary radiation beams into a propagation region within which they may interfere with one or more of the other secondary radiation beams and (v) forming an interference pattern in the propagation region comprising one or more maximum at various positions.

The method may comprise the further step of;

(vi) deducing the frequency components in the primary input beam from the positions of the or each maximum in the propagation region.

Figure 4A:
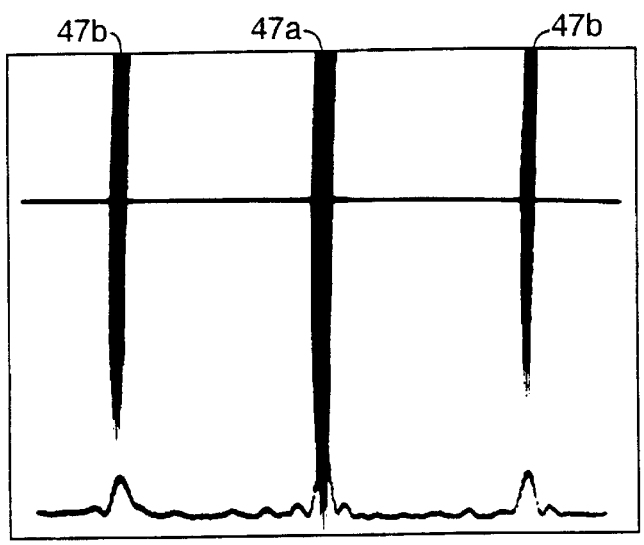
Figure 4B:
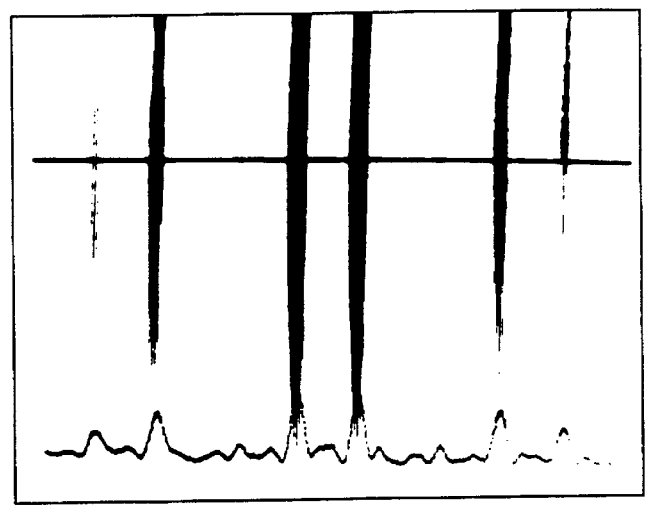
Figure 4C:
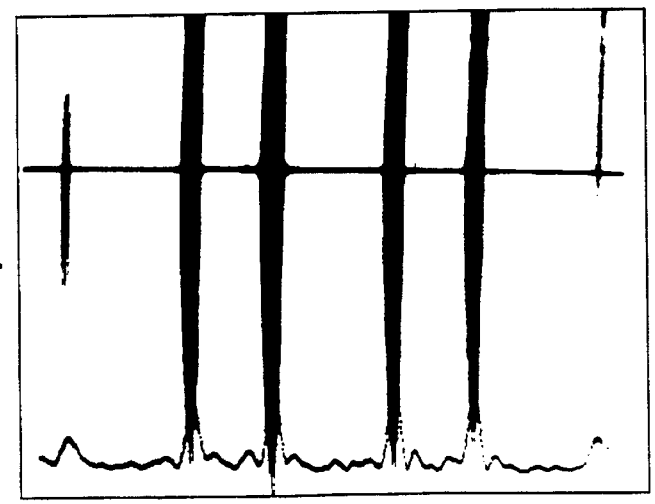
Figure 7:
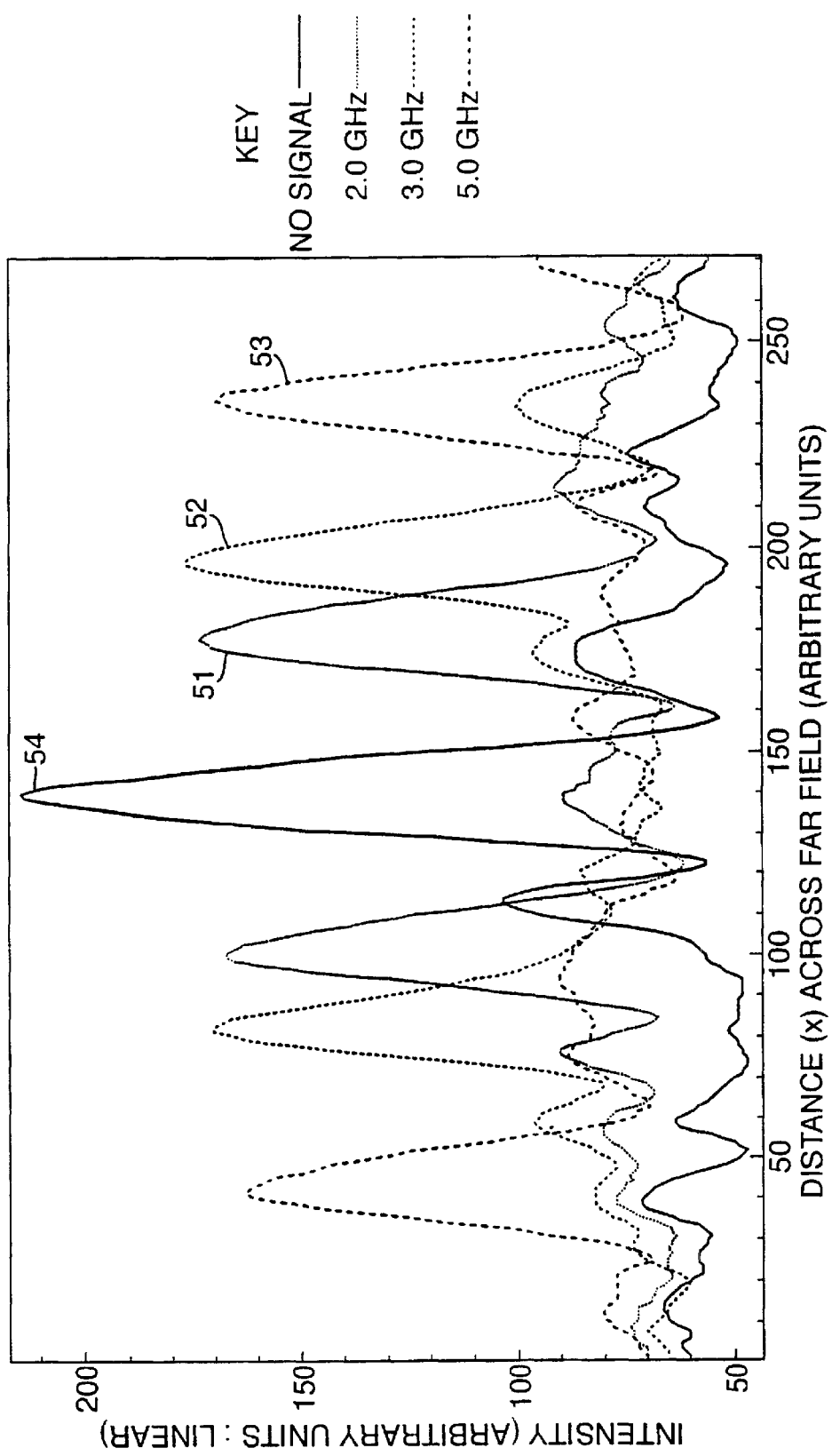

The invention will now be described, by example only, with reference to the following figures in which, FIG. 1 shows a schematic perspective view of a known electro-optic waveguide device, FIG. 2 shows a schematic diagram of the invention, FIG. 3 shows a mask diagram of a single chip GaAs waveguide array device having a variable optical delay across the array, FIG. 4(a) shows an infrared camera photograph of the far field diffraction pattern obtained from the electro-optic waveguide device shown in FIG. 3 for an input laser beam without any input modulation, FIGS. 4(b) and 4(c) show infrared camera photographs of the far field diffraction pattern obtained from the electro-optic waveguide device shown in FIG. 3 for an input laser beam with RF modulation, FIG. 5 shows line scans of the far field diffraction pattern for an input laser beam with no input modulation, showing the effect of changing the input laser wavelength, FIG. 6 shows line scans of the far field intensity pattern with the unmodulated input beam nulled and the modulation sidebands present for three different frequencies and FIG. 7 shows the line scans shown in FIG. 6 on an expanded scale, to remove the effects of diffraction sidebands.

A part of an electro-optic waveguide device which may be used in the invention is shown in FIG. 1. The electro-optic waveguide device and its operation is described in U.S. Pat. No. 5,239,598. In summary, the device, referred to generally as 1, comprises a heavily doped n-type (n+) GaAs substrate 2 typically having a doping concentration of $1 \times 10^{18}$ cm$^{-3}$. This layer 2 is overlaid with a cladding layer 3 of n$^+$ Ga$_x$Al$_{1-x}$As with like dopant species and concentration.

The cladding layer 3 is surmounted by a waveguide core layer 4. This layer 4 is composed of n$^-$ (undoped, residual n-type) GaAs. The layers may be considered as being all of the Ga$_x$Al$_{1-x}$As system. The layer 4 has grooves 5 extending into its upper surface 6, extending from the front face of the device 1 most but not all of the way to a parallel rear face (not shown) having horizontal and vertical edges (7, 8 respectively). Rib waveguides 9 are defined between the grooves 5. Typically, the waveguides 9 have a width of 2.6 $\mu$m and a length of 3 mm. FIG. 1 illustrates two waveguides 9 (three grooves 5), although in practice a much greater number of waveguides will be included in the complete device.

Each of the waveguides 9 is coated with a layer of aluminium 10 and bond pad 11 connected to a DC bias voltage source 12. Each waveguide 9 is therefore individually addressed. The front face 13 and the rear face 7/8 of the device 1 are carefully cleaved to provide optical quality surfaces.

In operation, the device 1 may be illuminated with radiation (represented by line 20) focused to a small spot (say, 2 $\mu$m diameter) on the waveguide layer 4 region of the rear face 7/8. Typically, this is 500 $\mu$m from the waveguide ends. The light then diverges from the spot to the waveguides 9. Light beams emerging from the waveguides 9 are indicated by divergent arrows such as 21. The emergent light beams 21 combine to form a common far field diffraction pattern having a central intensity maximum 22, at position 24, and two or more subsidiary maximum 23, as illustrated at the bottom of FIG. 1.

Each waveguide 9 may support horizontal and vertical modes of light propagation. The waveguides 9 produce light output intensity substantially confined to the lowest order horizontal and vertical modes and the output of higher order horizontal and vertical modes is inhibited. The result is that the waveguides 9 in combination produce a far field diffraction pattern arising substantially from lowest order spatial modes. For further explanation of the behaviour of light propagating through the device, see U.S. Pat. No. 5,239,598.

The refractive index and optical path length on each waveguide 9 are dependent on the electric field supplied by means of voltage supply 12, since the waveguide core layer material 4 has electro-optic (i.e. electro-refractive) properties. Variation of the voltage on the aluminium layer 10 of any waveguide 9 consequently alters the phase of its light output. The far field diffraction pattern is a vector sum of phase and amplitude contributions from the waveguides 9 and the position of the principal maximum 24 may be varied by varying the waveguide voltages. By controlling the voltages applied to the electrodes on each of the waveguides, the beam in the far field diffraction pattern can therefore be formed and scanned, or focused electronically. The far field diffraction pattern produced by the device 1 is fully formed at a range of less than 0.5 mm in air, or less than 1.8 mm in a GaAs medium. Beam steering through up to 20° may be achieved with waveguide voltages in the region of 20 V.

The present invention is a device for spatially separating components of different frequency in an input beam of radiation and comprises an array of electro-optic waveguides with each waveguide having an associated optical delay line of different optical delay. Typically, the electro-optic waveguides have the construction of the electro optic waveguide array shown in FIG. 1, with an additional upper cladding layer of n⁻ $Ga_xAl_{1-x}As$ ($1\times10^{15}$ cm$^{-3}$) to reduce optical losses by keeping the light away from the electrode metal. In the conventional device shown in FIG. 1 the far field beam may be steered by varying the voltages applied to each individual waveguide. Hence, the far field diffraction pattern may be electronically steerable. In the present invention, the far field diffraction pattern is frequency steerable as well as electronically steerable due to the different delay lengths of each waveguide. Therefore, if the delay lengths are short, for example 500 μm, the device may be used as an optical spectrum analyser and if the delay lines are long, for example 10 cm, the device may be used as a microwave spectrum analyser.

A schematic diagram of one embodiment of the device 30 of the present invention is shown in FIG. 2. The apparatus comprises an n-way splitting device 31 and n optical phase shifters 32. For example, the optical phase shifters 32 may be the electro-optic waveguide device 1 shown in FIG. 1. The device 30 also comprises an array of n optical delay lines 33, having a linear variation in delay length across the array, and an output linear phased array 34. The output spectrum from the device 30 may be viewed on a TV camera or a staring linear detector array 37 to record, process, display or store the output spectrum. A beam of radiation 35 to be scanned may be input to the device 30 directly. Alternatively, the beam 35 may be modulated by an electro-optic intensity modulator 36. The function of the electro-optic intensity modulator 36 will be described in more detail later.

In one embodiment of the invention, the device 30, represented schematically in FIG. 2, may be formed on a single chip. By way of example of a single chip device, there now follows a description of a 16 waveguide, single chip GaAs device.

A mask diagram of a single chip 16 channel GaAs electro-optic waveguide device is shown in FIG. 3. The device 30 comprises an input waveguide 39, into the beam 35 is input, and a 1 to 16 way multimode interference splitter 40 for splitting the input beam 35 into n different outputs. For example, this may be a multimode interference splitter as described in U.S. Pat. No. 5,410,625. The device 30 also comprises 16 electro-optic waveguides 41 for optical phase control, each electro-optic waveguide 41 having an electrode 42 for applying an electric field across each waveguide 41. This enables each waveguide 41 to be individually addressed.

Associated with each electro-optic waveguide 41 is an optical delay line 43, each being of a different length. Preferably, there is a substantially linear variation in delay length across the electro-optic waveguide array. At the output of the delay lines 43 is a closely spaced output waveguide array 44. The output waveguide array is illustrated in the figure as an array of horizontal black lines 44, each having an output position 46, in connection with the delay lines 43.

In practice, and for ease of construction, each electro-optic waveguide 41, the associated delay line 43 and the associated output waveguide 44 may be formed as one waveguide such that the device is an array of electro-optic waveguides each having a different length (i.e. having a different delay). An array of electro-optic waveguides each having a different optical length shall herein be referred to as an array of electro-optic waveguide delay lines. It is also possible to construct the device such that the components 41,43 and 44 are separated on a single chip. Typically, the electro-optic waveguides 41 have the form of the structure shown in FIG. 1 and are represented in the figure as horizontal black lines extending from the optical splitter 40.

In use, continuous wave radiation 35 from an input laser (not shown) may be input to the device 30 at the multimode interference splitter 40, where the input beam is split into 16 channels. Each of the 16 split signals is passed through one of the electro-optic waveguides 41 (or phase shifters), into the associated delay line 43 and then to the output waveguides 44 forming an output waveguide array. A set of 16 output beams 45 therefore emerge from the output waveguides 44, at positions 46, into a region in which they interfere, herein referred to as the propagation region. Typically, the propagation region may be a slab waveguide (not shown) such that the emerging beams 45 are confined on the chip, but propagate as if in free space. Alternatively, the propagation region may be a region of free space.

The output beams 45 from each of the output waveguides 44, output at positions 46, interfere in the propagation region with most or all of the output beams 45 from the other output waveguides 44 such that different frequency components form intensity maxima at different positions within the propagation region. The interference pattern, or far field diffraction pattern, typically at a distance of a few millimetres or so, may then be viewed using a camera sensitive to the particular wavelength of light.

The output waveguides 44 are closely spaced, typically with a spacing of less than 100 μm, and preferably more closely spaced e.g. between 5–20 μm separation between adjacent output positions 46. The output positions 46 of each output waveguide 44 are arranged to be along a substantially rectilinear line, L. Preferably, the output waveguides 44 are spaced such that the centre-to-centre pitch between any two adjacent output positions 46 is directly proportional to the optical time delay difference between those two adjacent output waveguides. This ensures intensity maxima corresponding to different optical frequencies will occur at well defined angles in the propagation region and that the angular difference between the maxima for two different frequency optical beams will be directly proportional to the difference in frequency between the two beams.

In a further preferred embodiment, the output positions 46 are spaced equally and have the corresponding optical time delay differences between each pair of adjacent waveguide delay lines also correspondingly equally spaced, such that the optical delay lines 43 have a substantially linear variation in delay length across the array. Typically, this may correspond to a spread of time delays between 0 and 1 nanosecond (i.e. the relative delay of the $n^{th}$ waveguide is n/16 nanoseconds, where n=1 to 16). In this embodiment, the device 30 may be operated as a 16 channel spectrum analyser having a 1 GHz channel separation. If the optical time delay difference between adjacent delay lines is of the order of 100 ps, this gives a free spectral range (i.e. the maximum frequency range of operation) of 10 GHz, and a resolution of 10 GHz/N, where N is the number of delay lines. The difference between the maximum and minimum delay line length s therefore determines the frequency resolution which may be achieved with the device.

Results have been obtained for a device having the form of the GaAs chip device shown in FIG. 3 for an input diode pumped Nd:YAG laser beam at 1.064 $\mu$m. If the voltages applied to the electro-optic waveguides 41 are initially set so that all of the 16 output beams 45 are in phase, this gives a single main beam in the far field diffraction pattern and two sidelobes (due to the periodicity of the output intensity pattern). This is illustrated in FIG. 4(*a*) which shows a single main beam 47*a* and two sidelobes 47*b*. The main beam 47*a* and sidelobes 47*b* may then be scanned by changing the phase of the 16 output beams linearly across the array.

For example, if the phases were stepped (from the uniform starting condition) by 360°/16 (i.e. 22.5°) across the array, the beam would steer by 1/16th of the main beam-to-first sidelobe separation distance. More generally, if the phases were stepped by n×22.5°, the beam would steer by n/16th of the main beam-to-first sidelobe separation distance until, when n=16, the original pattern would be reproduced as the array output beams would be in phase again (as in the initial condition).

In practice, the phases could always be set to values within the range 0 to 360° by suitable choice of the voltages applied to the electrode of each waveguide. The effect of using added delay lines, rather than equal length waveguides, is that the beam may also be steered if the input optical wavelength or frequency is altered. This cannot be achieved with a conventional electro-optic waveguide but is possible in the present device because, as the input wavelength is changed, the output phases change linearly across the array, in the same way as for the main beam being electronically scanned. For example, for a device with a linear 0 to 1 nanosecond waveguide delay line set, a 1 GHz frequency change of the input optical beams steers the beam through 1/16th of the main beam-to first sidelobe separation, because a change of the optical frequency of 1 GHz corresponds to a change of exactly one cycle per nanosecond, or a 360° phase shift in a 1 nanosecond delay line.

The delay of the $n^{th}$ waveguide gives a corresponding phase shift of n×22.5°, which is the required set of phases for steering the beam through 1/16th of the main beam-to-first sidelobe separation. Thus, the device provides frequency dependent beam scanning which has many advantages over electronic scanning. Furthermore, the two types of scanning implemented together give the device still further advantages. Although the device is described as a 16 channel device, a smaller or greater number of channels may be used in practice.

A particularly useful application of the device is as a staring spectrum analyser. The device may be operated as an optical spectrum analyser or an RF spectrum analyser. Referring to FIG. 2, for RF spectrum analysis, the input beam of radiation 20 to be analysed is passed through an electro-optic frequency modulator 36 before entering the device 30. A microwave signal 50 applied to the modulator 36 therefore adds frequency components to the input wave 20 which are deflected through different angles (proportional to the modulation frequency) by the delay line phased array 41/43.

It is important to use a balanced electro-optic modulator 36 to avoid adding higher harmonics and to allow the frequency of the input beam to be removed from the far field diffraction pattern. By setting the intensity modulator to a null, the input beam may be suppressed to show only the modulation sidebands. This is illustrated in the spectra shown in FIGS. 4(*b*) and 4(*c*) in which the frequency of the input beam has been removed from the spectra.

FIG. 5 shows the intensity of the output waveguide array as a function of distance across the far field diffraction pattern for an input laser at three different frequencies (curves 48,49,50). This illustrates the added effect of using delay lines in combination with the electro-optic waveguides. That is, the beam may be steered if the input optical wavelength or frequency is changed, as well as by varying the voltages applied to the waveguides.

FIG. 6 shows the intensity scan of the far field diffraction pattern for three different RF frequencies, 2 GHz, 3 GHz, and 5 GHz, (curves 51,52,53 respectively) with the intensity modulator 36 set to null. The carrier beam is suppressed and only the modulation sidebands are present in the scan. FIG. 7 shows the intensity scans shown in FIG. 6 on an expanded scale (arbitrary units), with the intensity scan for no modulation signal (peak 54) also shown. If a number of different frequencies are used to modulate the input beam, they will all be observed simultaneously in the diffraction pattern. The device does not therefore scan through the frequency range as in a conventional scanning spectrum analyser.

Without the optical modulator 36 in FIG. 2, the device essentially operates as an electrically tuneable optical spectrometer. It is capable of delivering an arbitrarily high optical resolution which is better than that which may be achieved using conventional optical grating spectrometers, the resolving power of which is limited by the grating width and pitch. The performance also matches that of scanning Fabry-Perot etalon interferometric spectrometers but has the advantage of being able to analyse optical spectra with an arbitrary number of output channels, each of which is staring and does not require scanning to measure the spectrum.

Another application of the device is as an electrically controllable wavelength division multiplexer/demultiplexer. This is of particular use in the field of optical fibre telecommunications. Wavelength division multiplexing/demultiplexing is used to combine a number of closely spaced wavelength laser beams on to an optical fibre, and to separate them at the other end. In conventional wavelength division multiplexers/demultiplexers, this is achieved passively which means that the device must be constructed with high accuracy in order to set to the required frequency [Y. Inoue, Integrated Photonic Research 1996, Conference Proceedings, April 1996, Boston USA, Paper IMC1 pp 32–35, C. van Dam et al., Integrated Photonics Research 1996, Conference Proceedings, April 1996, Boston USA, Paper IMC6 pp 52–55].

The present device may be as a wavelength division multiplexer/demultiplexer and provides an advantage over known multiplexers in that active alignment is possible by fine tuning the voltages applied to the electrodes on the electro-optic waveguides. Active control of the centre wavelength, and fine control of the individual waveguide phase shifts, are important in wavelength division multiplexing as, in practice, it is difficult to make passive devices with sufficient accuracy.

In practice, in wavelength division multiplexing/demultiplexing, the frequency separation does not need to be too large, typically around 50–100 GHz, as opposed to the typical values of around 1 GHz required in a spectrum analyser. This means that the optical delay lengths need not be as long as in the spectrum analyser application. For a 100 GHz resolution, for example, the difference between the maximum and minimum delay lengths would be 800 $\mu$m.

The device may also be used to control the wavelength of an on-chip laser. Versions of such devices which use an array of passive waveguide delays are described by M. Zirngibl et al., Integrated Photonics Research 1996, Conference proceedings, April 1996, Boston USA, Paper IMC6 pp 52–55 and L. H. Spiekman et al., Integrated Photonics Research 1996, Conference proceedings, April 1996, Boston USA, Paper IMC3 pp 136–139. However, these devices are difficult to design and construct accurately enough to set the wavelength to any required value.

In the present case, the array may be used as part of the laser cavity to act as a wavelength filter. For example, referring to FIG. 3, a gain region may be placed in the input waveguide 60, situated before the n-way splitter 40 and a reflector (not shown) may be placed in the propagation region. The reflector is arranged so that it only reflects light of one particular frequency back into the array of delay lines 43, so that the cavity gain is maximum for the chosen frequency, and the device therefore lases at a wavelength corresponding to the reflected optical frequency providing the cavity gain is high enough. By using an array of electrically tuneable device of the present invention, rather than a passive array, the laser frequency may be set accurately to any required value to an accuracy within the resolution limits of the array. Typically, this may be <100 MHz. The laser wavelength may be held constant or tuned electronically by adjusting the voltages applied to the electrodes on the electro-optic waveguides, thus providing feedback into the laser cavity only at one wavelength. This device may be of particular use for the generation of microwave frequencies which requires fine tuning of two input laser frequencies.

The embodiment of the invention shown in FIG. 3 is described for a single chip GaAs device. Although in practice it may be more convenient to fabricate the device on a single chip, alternatively the delay line array could be deployed on a separate chip from the electrically biasable waveguide array. Other III–V semiconductor waveguide technology may also be used, for example InP/InGaAsP.

In another embodiment of the invention, the device may be a fibre based device in which the electro-optic waveguides are used in combination with fibre based components. For example, referring to FIG. 2, the optical delay lines 32 may be optical fibres of different length. Similarly the n-way splitter 31 may a fibre component or a glass block. If optical fibres are used it may be preferable to have electro-optic waveguides formed on a lithium niobate chip, rather than a GaAs chip.

With reference to FIG. 2, the device is arranged such that the split input beams pass through the electrically biasable waveguides before passing through the delay lines 33. However, the device may also be configured such that sequence in which the phase control and delay functions are implemented is reversed so that the delay function is introduced prior to the phase control. For example, in a fibre based device, this may be achieved by having optical fibre delay lines 33 situated between the n-way splitter 31 and the electrically biasable waveguides 32. Similarly, referring to FIG. 3, for a single chip device, the varying delay lengths 43 may be situated before the electrodes 42 for implementing the phase control.

The input laser, from which the input beam is generated, the electro-optic modulator and the n-way splitter and phase shift array may all be employed on a single chip. This enables a small, light and rugged device to be constructed, with the dimensions depending only marginally on the number of channels required.

The device can be easily operated over a wide spectral range, limited by the transparency of the electro-optic material and also any external delay line medium. Current GaAlAs technology enables coverage of the wavelength range between 0.7 $\mu$m and 10 $\mu$m. The device also has the ability to perform RF spectrum analysis, when used with an optical modulator device at the input.

If the device is used with a tuneable CW laser beam as the input, it will electronically scan, as well as scanning in small changes in wavelength, without any adjustment of the phase shifters used in the device. Furthermore, if linear arrays are connected to output fibres and these fibres are brought into a two dimensional array, an x-y scanning ability may be achieved by arranging short delays between each linear array input. The linear arrays would need to have a very high wavelength sensitivity (using long delays) so that when the free spectral range (or planned scanned angle) is exceeded, the next scan is displaced a small amount normal to the first scan axis.

What is claimed is:

1. A device for receiving a primary beam of radiation (35) and for spatially separating components of frequency in the primary radiation beam (35) comprising;

means (31;40) for separating the primary radiation beam into a plurality of secondary radiation beams, each secondary radiation beam having a respective phase, $\theta_i$, a plurality of electrically biasable waveguides (32; 41) forming a waveguide array, each for transmitting a secondary radiation beam to an output, wherein each waveguide (32; 41) has an associated optical delay line (33; 43) having a corresponding optical delay time, wherein each of the optical delay times is different, means (42) for applying a variable electric field across each of the waveguides (32; 41) such that the phase, $\theta_i$, of each of the secondary radiation beams transmitted through the respective waveguide (32; 41) may be varied by varying the electric field, the waveguides (32; 41) being arranged such that the secondary radiation beams output from each of the waveguides (32; 41) interfere with a secondary radiation beam output from at least one of the other waveguides so as to form an interference pattern in a propagation region, the interference pattern comprising one or more maximum at various positions in the propagation region, and such that the device provides at least two outputs, characterised in that the device further comprises means (36,50) for applying an RF modulation to the primary beam of radiation (35).

2. The device of claim 1, forming a staring spectrum analyser for analysing a primary beam of microwave radiation.

3. The device of claim 1, wherein each adjacent pair of waveguide outputs are spaced apart by an amount proportional to the optical time delay difference between the corresponding adjacent pair of waveguides.

4. The device of claim 3, wherein the waveguides (32; 41) have a substantially linear variation in optical time delay across the waveguide array.

5. The device of claim 3, wherein the optical time delay difference across the waveguide array is at least 100 picoseconds.

6. The device of claim 5 wherein the optical time delay difference across the waveguide array is at least 10 nanoseconds.

7. The device of claim 1, wherein the propagation region is a region of free space.

8. The device of claim 1 wherein the propagation region is a slab waveguide.

9. The device of claim 1 wherein the electrically biasable waveguides (32; 41) are group III–V semiconductor waveguides.

10. The device of claim 9, wherein the electrically biasable waveguides are GaAs waveguides.

11. The device of claim 9, wherein the electrically biasable waveguides are InP/InGaAsP waveguides.

12. The device of claim 1 wherein the electrically biasable waveguides (32; 41) and the associated optical delay lines are formed in one.

13. The device of claim 1, formed on a single chip.

14. The device of claim 1 wherein the waveguide array comprises an array of electrically biasable waveguides (32; 41) each having an associated optical fibre delay line (33;43).

15. The device of claim 1 wherein the means for separating the primary radiation beam into a plurality of secondary radiation beams is a multi mode interference splitter (40).

16. The device of claim 1 wherein each of the electrically biasable waveguides (32; 41) has independent means (42) for varying the electric field across the respective electrically biasable waveguide (32; 41).

17. The device of claim 16 wherein each electrically biasable waveguide (32; 41) has an independent variable voltage supply.

18. The device of claim 1, and further comprising one or more output waveguide (44) located within the propagation region, such that the or each output waveguide may receive a secondary radiation beam of selected frequency output from one or more waveguide (32; 41).

19. A method for spatially separating components of frequency in a primary radiation beam (35) comprising the steps of;

(i) applying an RF modulation to the primary beam of radiation (35), (ii) separating the primary radiation beam (35) into a plurality of secondary radiation beams each having a respective phase, $\theta_i$, (iii) transmitting each of the secondary radiation beams through one of a plurality of electrically biasable waveguides (32; 41) forming a waveguide array, wherein each waveguide has an associated optical delay line (33; 43) having a corresponding optical delay time, wherein each of the optical delay times is different, (iv) applying a variable electric field across each of the waveguides (32; 41) and (v) varying the electric field across each of the waveguides (32; 41) so that the respective phases, $\theta_i$, of the secondary radiation beams transmitted through each of the waveguides (32; 41) may be varied, and (vi) outputting the secondary radiation beams into a propagation region such that they interfere with one or more of the other secondary radiation beams to form an interference pattern in the propagation region comprising one or more maximum at various positions.

20. The method of claim 19, and further comprising the step of;

(vii) deducing the frequency components in the primary beam of radiation from the positions of the or each maximum in the propagation region.

* * * * *